United States Patent Office 3,439,889
Patented Apr. 22, 1969

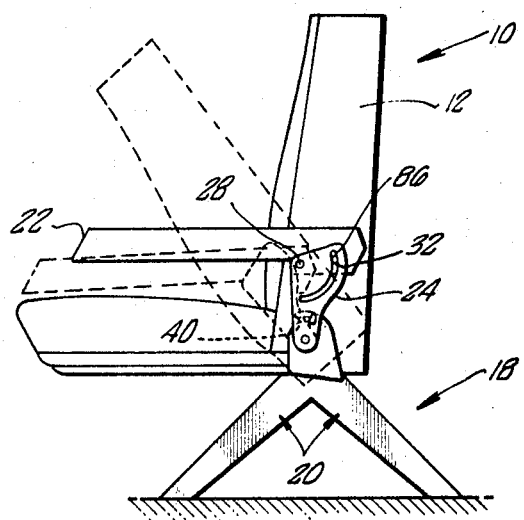
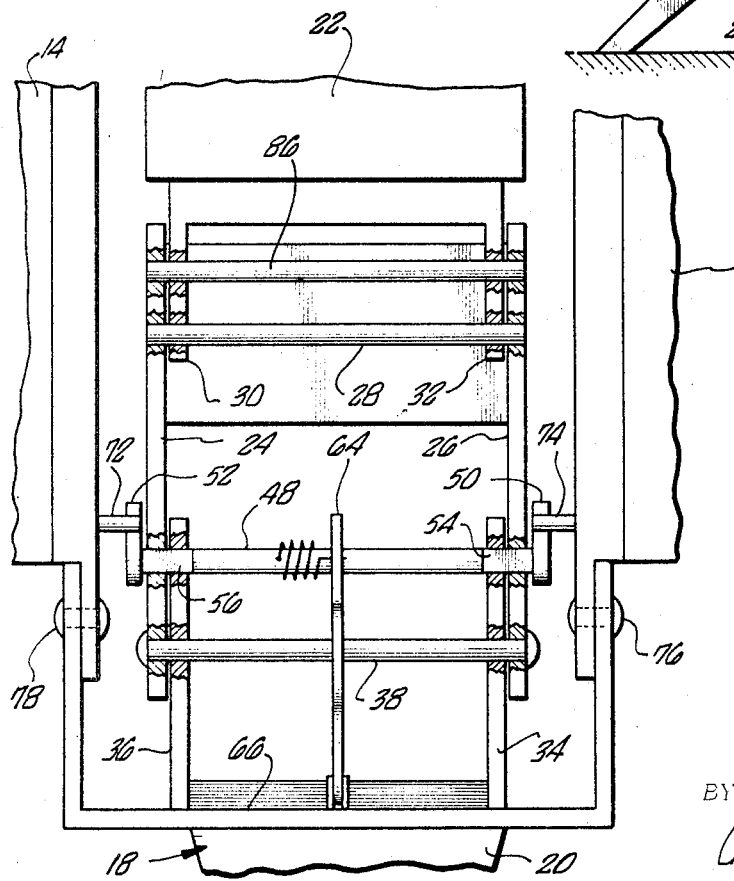

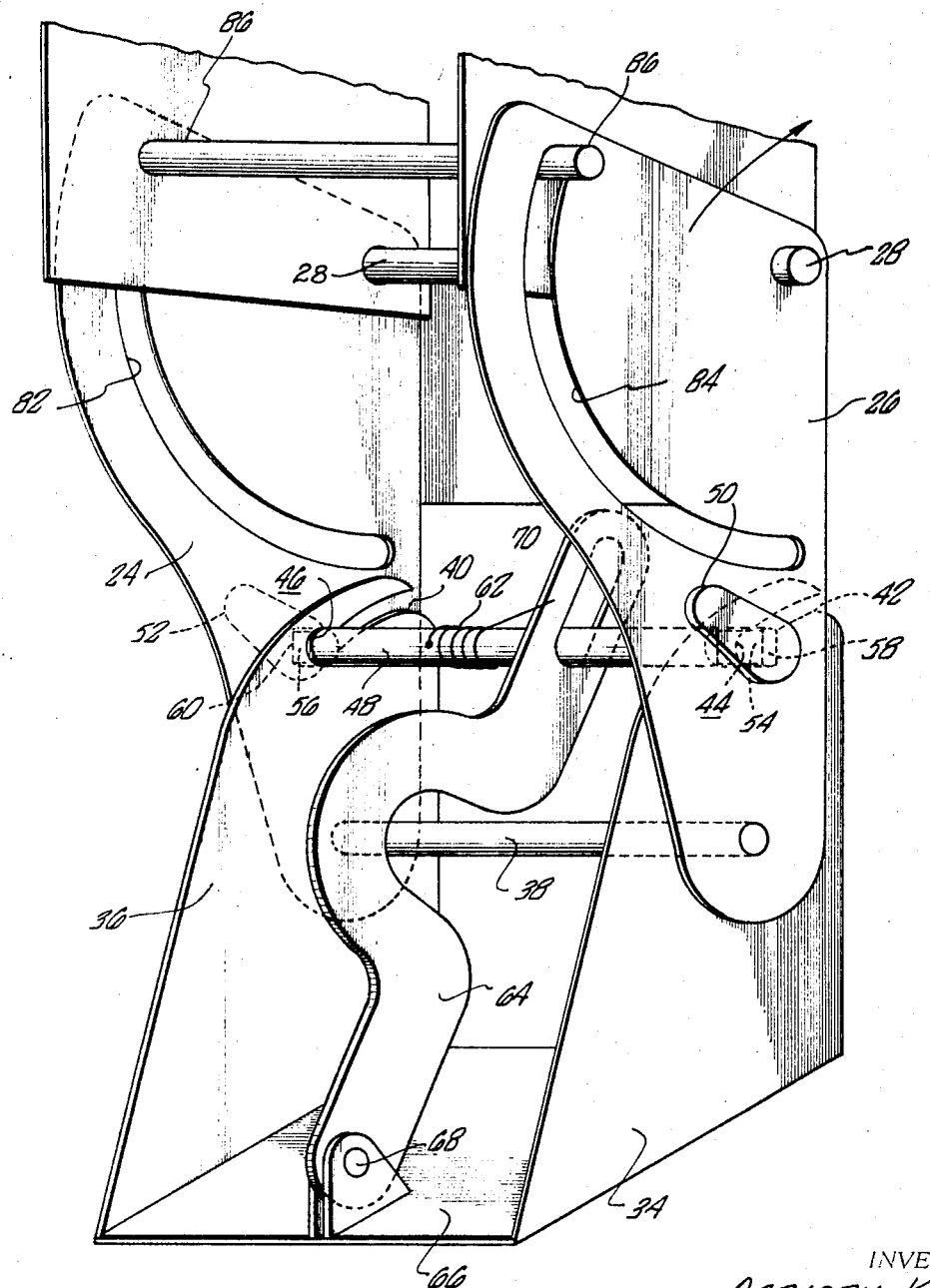

3,439,889
AIRCRAFT SEATING STRUCTURE
Asbjorn Karlsen, Pacific Palisades, Calif., assignor, by mesne assignments, to Hardman Aerospace, Los Angeles, Calif., a corporation of California
Filed Feb. 13, 1967, Ser. No. 615,544
Int. Cl. B64d *11/06;* A47c *7/54;* B60n *1/06*
U.S. Cl. 244—122                                    16 Claims

ABSTRACT OF THE DISCLOSURE

An aircraft seating structure which has an armrest between adjacent seats. The armrests are pivotally mounted on the frame but constrained against rotation except when an adjoining seat's back is folded forward. The constraint is provided by a rotatable shaft disposed in enlarged openings at the terminus of a pair of curved slots disposed in a pair of armrest support uprights. The shaft has a narrow or neck portion which upon rotation of the shaft allows its translation in the slots and the pivoting of the armrest downwardly out of its in-use position.

Background of the invention

The present invention relates in general to seating structures which are particularly suitable for use with aircraft and, in particular, to seating structures wherein the armrest lowers to one side of the seat's cushion upon forward rotation of the seat back.

Aircraft seating accommodations ideally are designed to effect maximum comfort and safety for passengers. Another design requirement usually requires that the seating structure employed be readily collapsible into a compact unit for its transportation and storage. Comfort dictates the use of armrests between each adjacent seat. Storage and transport require that each passenger seat back be capable of folding forward over the seat's bottom cushion with the seat's armrests not extending above the folded back.

In addition, under impact conditions passenger safety is compromised if the armrests are not folded out of their normal positions because they present a relatively hard and protruding hazard.

Summary of the invention

The subject invention provides an improved aircraft seating structure which may be readily collapsed for compact storage and transport with its armrests lowered to a point where they do not protrude above the folded seat back and, in addition, an armrest support structure which collapses the armrests out of position under impact conditions.

In one form, the invention contemplates an aircraft seating structure which has a frame upon which is mounted at least one passenger seat. There is at least one armrest for each passenger seat which is mounted in position to support a passenger's arm. Means are provided for lowering the armrest towards the aircraft's floor, or seat's bottom cushion, when the seat's back is rotated forward for storage or as a result of impact by a breakover force.

In one preferred form the armrest itself is pivotally mounted in a pair of armrest support members for vertical rotation into the seating structure's back to increase seating flexibility. Each pair of armrest support members is pivotally mounted in a pair of upright supports attached to the frame. In this configuration, the armrest has, in effect, two pivot points, one for raising and lowering the arm into and from the back and one for lowering the arm towards the seat's bottom cushion. To prevent inadvertent lowering of the armrests towards the seat's bottom cushion, means are provided to constrain movement of the armrest supports about their pivotal connection to the uprights. These means may comprise a curved slot in each of the upright members through which is disposed a rotatable shaft. The shaft is connected to each of the armrest supports and normally positioned and supported in an enlarged opening at the inward terminus of each curved slot. The shaft has a narrow and wide portion in each of these enlarged openings, the narrow portion being capable of registration, upon rotation of the shaft, in the slot proper while the wide portion is normally disposed to keep the shaft from translating in the slots. The shaft is operatively coupled, as through levers, to the back of adjoining seats such that upon forward rotation of either one of the seats the shaft rotates to engage or register its narrow portion in the guide slots. Upon continued rotation of the seat back, the shaft is forced to translate in the curved slots and carry the armrest supports about their pivot point to lower the armrest. To maintain the normal position of the armrest, preferred practice also dictates the use of means to maintain the wide portions of the shaft in position to prevent the latter's translation in the slots; this can be accomplished through the use of bias means such as a spring which tends to maintain the wide portions facing the guide slots. The actuating levers may be engaged by lugs or the like on the back of each seat.

The seating structure of the present invention provides a safe and readily storable and transportable seat. Safety is enhanced because an impact which would rotate a seat's back forward lowers the seat armrest. Storage and transportability are improved because the armrests are readily depressed by merely rotating the back forward about its pivot.

These and other features, aspects and advantages of the present invention will become more apparent from the following description, appended claims and drawings.

Brief description of the figures

FIGURE 1 is a side elevation of a preferred seating structure of the present invention;

FIGURE 2 is a rear elevation, partly in section, of the preferred means for lowering the seat's armrest; and FIGURE 3 is a perspective view of the rear of the structure shown in FIGURE 2.

Description of the preferred embodiments

Seating structure 10 has a plurality of passenger seats disposed in side-by-side relation, typically three in number. One of these seats is indicated by reference numeral 12 in FIGURES 1 and 2, while a second of these seats is shown by reference numeral 14 in FIGURE 2. Seat 14 is omitted from FIGURE 1 for the purpose of clarity. The seats themselves may take any number of known forms and therefore will not be discussed in detail except insofar as they relate to the subject matter of this invention. The seats are mounted on frame 18 which includes legs 20, the latter being adapted for attachment to an aircraft's floor (not shown).

Armrest 22 is pivotally mounted to armrest support members 24 and 26 by pivot pin 28. Pin 28 extends through a pair of armrest brackets 30 and 32. The armrest brackets are attached to and support armrest 22. Armrest support members 24 and 26 are mounted on either side of upright support members 34 and 36 which are in turn attached to frame 18. Pivot pin 38 is attached to supports 24 and 26 and rotatably received in uprights 34 and 36. Guide slots 40 and 42, shown in FIGURE 3, are disposed in uprights 36 and 34, respectively. Slot 42 terminates in an enlarged opening 44 while slot 40 terminates in an identically disposed and sized opening 46.

Rotatable shaft 48 is journaled in enlarged openings 44 and 46 in its normal position and secured to armrest brackets 24 and 26. Levers 50 and 52 are attached to either end of shaft 48 outside the armrest brackets. Where shaft 48 is journaled in uprights 34 and 36, the shaft has a cross section which has narrow and wide portions. Wide portions 54 normally faces slot 42 as does wide portion 56. These wide portions being greater in dimension than the width of slot 40 and 42 prevent the translation of shaft 48 in the slots. Narrow portions 58 and 60 are disposed such that upon rotation of shaft 48 they register in slots 42 and 40, respectively, to permit the translation of shaft 48 in these slots and allow brackets 24 and 26 to rotate about the axis of pivot pin 38. Spring 62 is attached to rotatable shaft 48 and to guide 64 to bias the shaft with its wide portions, 56 and 54, facing slots 40 and 42 to maintain the armrest in its normal in-use position. Guide 64 is connected to base support 66 at pivot 68. Slot 70 in guide 64 receives shaft 48 and limits its translational travel.

Lugs 72 and 74, shown in FIGURE 2, are attached to the backs of seats 14 and 12, respectively, in position to actuate levers 52 and 50 upon the folding over of either of the seat backs. The seat backs are pivotally connected to base support 66 by pivot pins 76 and 78.

As was previously mentioned, armrest 22 is pivotally mounted to armrest supports 24 and 26 at pivot pin 28 to provide for the vertical rotation of the arm into the space between adjoining seats. The armrest is constrained against excess rotation about pivot point 28 by slots 82 and 84 disposed in brackets 24 and 26. Pin 86 is received in curved slots 82 and 84. Slots 82 and 84 are defined by a radius from pivot point 28. The ends of these slots provide the limits of pivotal travel of armrest 22 by their constraint of pin 86 which is attached to armrest brackets 30 and 32.

The seating structure of the present invention operates as follows: Upon the depression of either or both of backs 12 and 14 forward over their associated seat cushions, lugs 72 and 74 engage levers 52 and 50 to rotate shaft 48 for registration of its narrow portions in slots 40 and 42. Lugs 72 and 74 continue to bear on levers 52 and 50 to carry shaft 48 and supports 24 and 26 forward in the direction of the arrow of FIGURE 3. A forward, intermediate position is shown by the phantom lines in FIGURE 1. Slot 70 in guide 64 limits the amount of travel for shaft 48 and its associated armrest supports 24 and 26. The armrest 22 is carried along with the rotation of its supports 24 and 26 about pin 38 to a lowered position. The lowest position for armrest 22 is dictated by the bottom cushion configuration of seating structure 10. If space is available between adjacent seat bottoms, then it is desirable for armrest 22 to fold into this space at the limit of seat back travel towards the seat's bottom cushion. In any event, arm 22 is disposed below the back of seat 12 when the back is in its folded position. The vertical positioning of armrest 22 is accomplished merely by lifting the arm to rotate pin 86 in slots 82 and 84 until the pin abuts the lower forward limits of the slots. The normal horizontal position for armrest 22 is shown in FIGURE 1 by the solid lines. This position is maintained by the abutment of pin 86 at the upper rear terminus of slots 82 and 84.

What is claimed is:

1. An improvement in combination with a seating structure of the type having two side-by-side passenger seats mounted on a frame with a single armrest between the seats, each seat having a seat back pivotally mounted to the frame, the improvement comprising:
    means for mounting the armrest to the frame above the seat backs' pivot points in an in-use position; and
    means for lowering the armrest from the in-use position towards the plane of the seats' bottom cushions in response to the forward rotation of each seat back about its pivot point while the other seat back remains in an upright position.

2. The improvement claimed in claim 1 wherein:
   (a) the armrest mounting means includes:
       (i) at least one upright mounted to the frame having a curved slot defined by a radius;
       (ii) at least one armrest support member pivotally mounted for forward rotation to the upright and attached to the armrest, the radius which defines the curved slot in the upright being from the support member's pivot point; and
       (iii) a shaft rotatably engaged in the curved slot of the upright and attached to the support member; and
   (b) the lowering means is operable to engage the support member and force the rotatable shaft along the curved slot to pivot the support member about its pivot point.

3. The improvement claimed in claim 2 wherein:
   (a) the armrest is pivotally connected to the support member;
   (b) the armrest support member has a curved slot defined by a radius from the point of pivotal connection of the armrest to the support member; and
   (c) an armrest pin is provided, the armrest pin being secured to the armrest and slidably engaged in the curved slot in the support member, the limits of armrest rotation about its pivotal connection to the support member being defined by the ends of the curved slot in the support member with one such end cooperating with the pin to normally maintain the armrest in its in-use position, the curved slot in the support member being disposed to allow the manual raising of the armrest from the in-use position to a position between the seat backs.

4. The improvement claimed in claim 2 wherein:
   (a) the curved slot in the upright terminates in an enlarged opening which is wider than the width of the curved slot;
   (b) the rotatable shaft has a narrow and wide portion normally disposed in the enlarged opening of the upright, the narrow portion being capable of registration in the curved slot, and the wide portion having a dimension larger than the width of the curved slot, the wide portion being normally positioned to prevent the registration of the narrow portion in the curved slot; and
   (c) the lowering means being operable to rotate the shaft until the narrow portion registers in the curved slot to allow translation of the shaft in the curved slot and the pivoting of the support member.

5. The improvement claimed in claim 4 wherein the armrest mounting means includes:
    a pair of the uprights, each upright being spaced apart from its complementary upright and having one of the curved slots and openings, each curved slot and opening being identically disposed with respect to its complementary slot and opening in the other upright;
    the rotatable shaft extending between each of the uprights and having one of the narrow and wide portions normally disposed in each of the enlarged openings with each of the wide portions in position to prevent the reistration of its associated narrow portion in such narrow portion's associated curved slot.

6. The improvement claimed in claim 5 wherein the rotatable shaft is biased to maintain the wide portions in position to prevent registration of the narrow portions in their associated curved slots.

7. The improvement claimed in claim 6 wherein the lowering means includes:
    a pair of levers on the rotatable shaft; and
    means operable by each of the seat backs upon rotation forward to engage one of the levers and rotate the rotatable shaft until the registration of the rotatable shaft's narrow portions in their associated slots and, upon continued engagement and forward rotation, to translate the rotatable shaft in the curved slots to lower the armrest and support members.

8. The improvement claimed in claim 7 including a guide having a slot through which the rotatable shaft is disposed, the slot being sized to limit the amount of translation of the rotatable shaft in the uprights' curved slots, the guide being pivotally mounted to the frame.

9. The improvement claimed in claim 8 wherein the armrest is pivotally mounted to the armrest support member such that it may be manually folded from its in-use position to a position between the seat backs.

10. The improvement claimed in claim 9 wherein:
the armrest support members each has a curved slot defined by a radius from the pivot point of the armrest;
the armrest having a pin disposed in the curved slots of the support members, the ends of such curved slots defining the limits of pivotal action for the armrest.

11. A seating structure capable of use as an aircraft seat comprising:
(a) a frame;
(b) a passenger seat on the frame having a seat cushion and a seat back, the seat back being capable of rotating forward in the direction of the seat cushion;
(c) at least one armrest for the passenger seat;
(d) an armrest support member pivotally carrying the armrest normally in a passenger arm support position;
(e) an upright secured to the frame beside the seat back having a curved slot defined by a radius from a pivot point, the armrest support member being pivotally carried by the upright at the pivot point;
(f) a pin disposed in the curved slot for movement therein, the pin being attached to the armrest support member such that movement of the pin in the curved slot rotates the armrest forward of the seat back and lowers the armrest together with the support member;
(g) means for maintaining the pin in a fixed position in the curved slot to maintain the armrest in its passenger arm supporting position; and
(h) means associated with the seat back to release the pin maintaining means upon forward rotation of the back and allow movement of the pin in the curved slot.

12. The seating structure claimed in claim 11 wherein:
(a) the armrest support member has a curved slot defined by a radius from the armrest point of pivotal connection to the support member; and
(b) an armrest pin is included which is attached to the armrest and slidably engaged in the curved slot in the support member, the armrest pin and the curved slot of the armrest support member allowing the manual raising of the armrest from the passenger arm support position to a position beside the seat back, the armrest pin being against an end of the curved slot of the support member in the passenger arm support position to maintain the armrest in the passenger arm support position.

13. The seating structure claimed in claim 11 wherein:
(a) the pin maintaining means includes
(i) an opening in the upright at one end of the curved slot, the opening being greater in diameter than the width of the curved slot and receiving the pin before the back is rotated forward, and
(ii) a wide portion of the pin larger than the width of the curved slot and normally disposed in the opening to prevent movement of the pin into the curved slot; and
(b) the release means includes
(i) a narrow portion of the pin adjacent the wide portion and sized to move in the curved slot, and
(ii) means operable upon forward rotation of the seat back to rotate the pin in the opening and engage the narrow portion in the curved slot.

14. The seating structure claimed in claim 13 wherein:
(a) the armrest support member has a curved slot defined by a radius from the armrest point of pivotal connection to the support member; and
(b) an armrest pin is included which is attached to the armrest and slidably engaged in the curved slot in the support member, the armrest pin and the curved slot of the armrest support member allowing the manual raising of the armrest from the passenger arm support position to a position beside the seat back, the armrest pin being against an end of the curved slot of the support member in the passenger arm support position to maintain the armrest in the passenger arm support position.

15. The seating structure claimed in claim 13 wherein:
(a) the release means includes:
a lever attached to the pin, the seat back being operable upon forward rotation to engage the lever and rotate the pin to engage the narrow portion thereof in the curved slot; and
(b) the pin maintaining means includes bias means operable to maintain the wide portion of the pin in position to prevent movement of the pin into the curved slot until the seat back is rotated forward.

16. The seating structure claimed in claim 15 wherein:
(a) the armrest support member has a curved slot defined by a radius from the armrest point of pivotal connection to the support member; and
(b) an armrest pin is included which is attached to the armrest and slidably engaged in the curved slot in the support member, the armrest pin and the curved slot of the armrest support member allowing manual raising of the armrest from the passenger arm support position to a position beside the seat back, the armrest pin being against an end of the curved slot of the support member in the passenger arm support position to maintain the armrest in the passenger arm support position.

References Cited

UNITED STATES PATENTS

| 2,409,316 | 10/1946 | Rogers | 297—417 |
| 2,660,228 | 11/1953 | Reinhold | 297—452 |
| 2,750,993 | 6/1956 | McGregor | 297—360 |

FOREIGN PATENTS

| 564,699 | 10/1923 | France. |
| 514,041 | 10/1953 | Italy. |

MILTON BUCHLER, *Primary Examiner.*

RICHARD A. DORNON, *Assistant Examiner.*

U.S. Cl. X.R.

296—65.1; 297—216, 416, 420